(12) United States Patent
Brophy et al.

(10) Patent No.: US 6,567,586 B2
(45) Date of Patent: May 20, 2003

(54) DUAL FIBER COLLIMATOR

(75) Inventors: Christopher P. Brophy, Corning, NY (US); Anita K. Thompson, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 80 days.

(21) Appl. No.: 09/912,209

(22) Filed: Jul. 24, 2001

(65) Prior Publication Data

US 2003/0021531 A1 Jan. 30, 2003

(51) Int. Cl.$^7$ ................................................. G02B 6/26
(52) U.S. Cl. ............................................. 385/33; 385/34
(58) Field of Search ............................... 385/31, 32, 33, 385/34, 35, 52

(56) References Cited

U.S. PATENT DOCUMENTS

| 5,446,815 A | 8/1995 | Ota et al. ....................... 385/33 |
| 5,682,452 A | 10/1997 | Takahashi ..................... 385/85 |
| 5,692,081 A | 11/1997 | Takahashi ..................... 385/78 |
| 5,737,104 A | 4/1998 | Lee et al. ..................... 359/124 |
| 5,857,048 A | 1/1999 | Feuer et al. ................... 385/88 |
| 5,917,626 A | 6/1999 | Lee ............................... 359/131 |
| 6,023,542 A | 2/2000 | Pan et al. ....................... 385/11 |
| 6,084,994 A | 7/2000 | Li et al. ......................... 385/31 |
| 6,122,110 A | 9/2000 | Park et al. .................... 359/641 |
| 6,148,126 A | 11/2000 | Zheng .......................... 385/33 |
| 6,168,319 B1 | 1/2001 | Francis ......................... 385/79 |
| 6,185,347 B1 | 2/2001 | Zheng .......................... 385/34 |
| 6,192,175 B1 | 2/2001 | Li et al. ......................... 385/27 |
| 6,229,934 B1 | 5/2001 | Melman et al. ............... 385/18 |
| 6,246,812 B1 | 6/2001 | Liu et al. ...................... 385/34 |
| 6,249,625 B1 * | 6/2001 | Pan .............................. 385/43 |

FOREIGN PATENT DOCUMENTS

| EP | 0 947 865 A1 | 6/1999 |
| EP | 1 074 866 A2 | 7/2001 |
| EP | 1 091 221 A2 | 11/2001 |

* cited by examiner

*Primary Examiner*—Georgia Epps
*Assistant Examiner*—M. Abutayeh
(74) *Attorney, Agent, or Firm*—Juliana Agon

(57) ABSTRACT

An optical fiber collimator (100) in an optical system, includes a pair of optical fibers (108) having emitting cleaved planes (112) to provide a substantially uniform angled side surface for forming a prescribed angle (101) relative to the optical axis (105) of the optical system. The pair of optical fibers (108) are disposed coplanarly in the object plane of the optical system for sharing the optical axis and separated from each other and from the optical axis on the same object plane. Optically coupled to the pair of fibers, a microlens (106) has a sloped rear surface (114) opposite a rotationally symmetric microlens surface (116) which bound a volume having a homogeneous index of refraction. The pair of fibers (108) are positioned near the focal plane containing the optical axis (105) of the microlens for the generation or reception of collimated beams at the prescribed angle (101) relative to the optical axis (105) of the microlens (106).

19 Claims, 4 Drawing Sheets

DUAL FIBER COLLIMATOR

BACKGROUND OF THE INVENTION

1. Field of the Invention

The present invention is directed to a fiber collimator and more specifically to a fiber collimator for use in an optical transmission system and/or an optical sensor system.

2. Technical Background

Collimation is a known process by which divergent beams of radiation or particles (e.g., light rays) are converted into parallel beams. Laser diode (LD) collimating lenses are commonly used in laser beam printers, bar code scanners and sensors. In addition, fiber collimators are widely used in a variety of optical applications (e.g., optical filters). Due to the recent increase in demand for fiber collimators as a basic building block, to be used with other components, in wavelength division multiplexed (WDM) systems, minimizing the fiber collimator reflective insertion loss has become increasingly important.

Commercially available dual-fiber collimators have typically utilized an individually aligned gradient-index (GRIN) microlens with fibers. These GRIN microlenses have generally been produced by an ion-exchange process and normally provide high coupling efficiency and have been utilized as collimators for laser beam printers, bar code scanners, optical isolators, circulators and digital versatile disc (DVD) players, as well as miniature objective lenses for medical/industrial endoscopes.

Planar microlens arrays (PMLAs) are two-dimensional GRIN-type lens arrays that integrate ion-exchange technology and photolithography for accommodating a plurality of fibers and lens array. By diffusing ions through a photolithographic mask into a glass substrate, numerous microscopic lenses can be formed in various sizes and patterns. Commercially available PMLAs are available with swelled lens surfaces, which tend to increase coupling efficiencies in transceiver applications, or with flat surfaces, which typically simplify collimation with fiber arrays. PMLAs have been used in liquid crystal projectors, three dimensional data processing and two dimensional laser diode (LD) coupling to fibers. Other manufacturers, such as Rochester Photonics Corp., have produced aspheric collimating microlenses that are intended to replace GRIN-type microlenses in collimating applications. Optical surface grinding, polishing, or molding are possible steps used to make the curved surfaces of generally aspheric microlenses.

However, when accommodating off-axis rays, the effectiveness of GRIN-type PMLAs and collimating arrays incorporating aspheric collimating microlenses are highly dependent on the configuration of the fiber collimator array. As such, it is important to configure the fiber collimator array to reduce insertion loss and internal reflections.

SUMMARY OF THE INVENTION

An embodiment of the present invention is directed to an optical fiber collimator in an optical system, which includes a pair of optical fibers having emitting or receiving cleaved planes to provide a substantially uniform angled side surface for forming a prescribed angle relative to the optical axis of the optical system. The emitting or receiving surfaces of the pair of optical fibers are disposed coplanarly in the object plane of the optical system for sharing the optical axis and separated from each other and from the optical axis on the same object plane. Optically coupled to the pair of fibers, a microlens has a sloped rear surface opposite a rotationally symmetric microlens surface which together with a cylindrical outer surface bound a volume having a homogeneous index of refraction. The pair of fibers are positioned near the focal plane containing the optical axis of the microlens for the generation or reception of collimated beams at the prescribed angle relative to the optical axis of the microlens.

According to an aspect of the present invention, the microlens comprises a wedged rod lens having a single refractive surface.

Additional features and advantages of the invention will be set forth in the detailed description which follows and will be apparent to those skilled in the art from the description or recognized by practicing the invention as described in the description which follows together with the claims and appended drawings.

It is to be understood that the foregoing description is exemplary of the invention only and is intended to provide an overview for the understanding of the nature and character of the invention as it is defined by the claims. The accompanying drawings are included to provide a further understanding of the invention and are incorporated and constitute part of this specification. The drawings illustrate various features and embodiments of the invention which, together with their description, serve to explain the principals and operation of the invention.

DETAILED DESCRIPTION OF THE PREFERRED EMBODIMENT(S)

The present invention is directed to the geometrical alignment of a dual optical fiber collimator that is used alone or in an array with a microlens that is also used alone or in an array. The optimum alignment between the microlens and the optical fibers are configured to reduce insertion loss and to reduce internal reflections. Instead of the conventional graded-index (GRIN) lens, each microlens, used with the present invention, is preferably a lens with a single refractive surface that is rotationally symmetric having a homogeneous index of refraction, such as an aspheric lens, a spherical lens, a rod lens, a ball or drum lens, or a Fresnel lens.

A GRIN lens has a radial gradient refractive index that decreases its index with distance from its optical axis (i.e., center 107). The radial gradient itself bends the incoming light and does not require a separate curved surface to bend the light. This causes light rays to travel in sinusoidal paths, with the length of one complete cycle being known as the pitch of the lens. Commercially available fiber array blocks typically have a pitch of either two-hundred fifty microns or one-hundred twenty-seven microns. The pitch of the fiber block limits the microlens diameter, which may limit the coupling efficiency of the lens since the mode-field diameter of the optical power (of the optical signal) in the microlens plane is limited by the microlens diameter.

Figure 1:
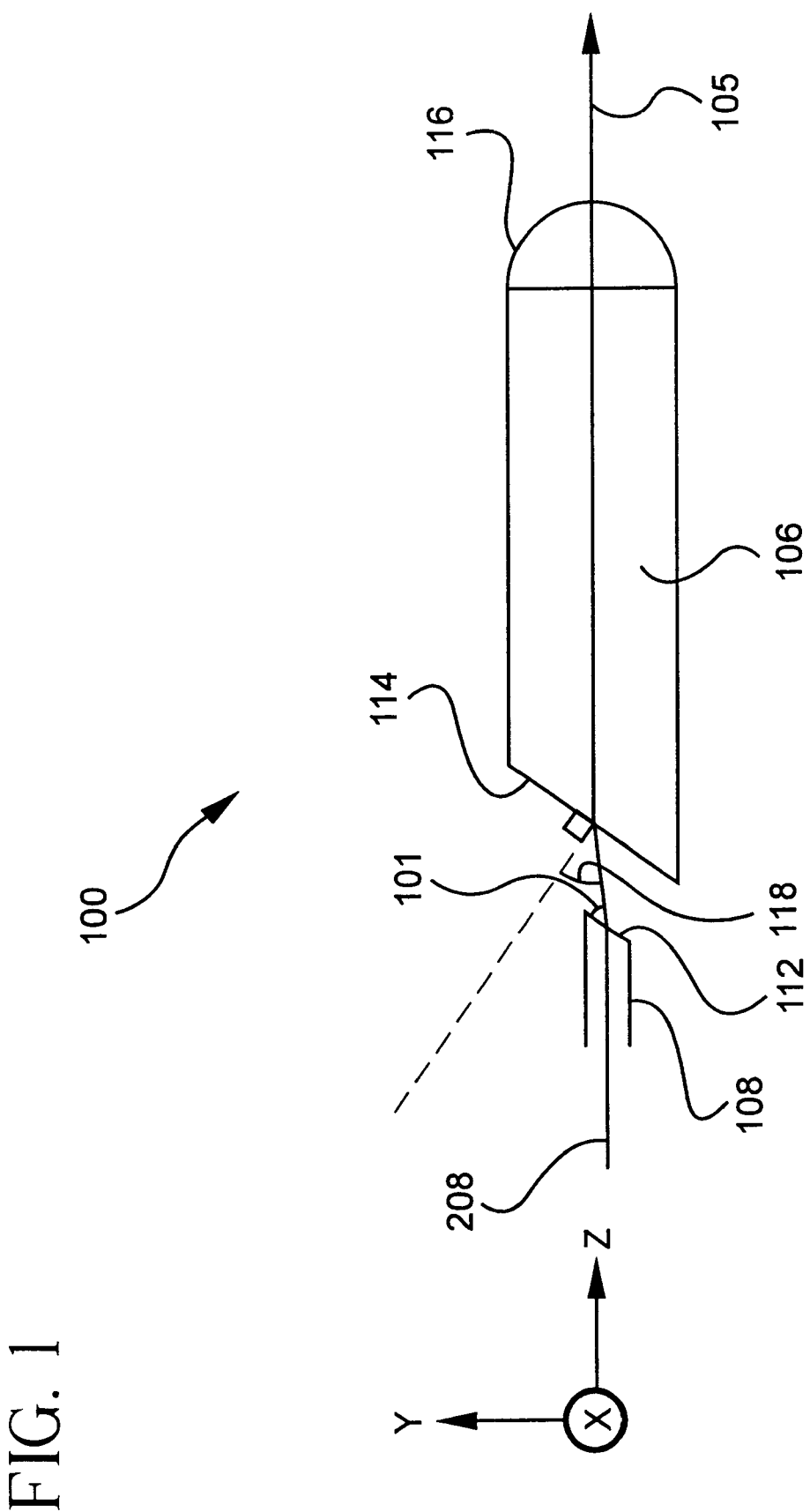
FIG. 1 is a side cross-sectional view of a dual-optical fiber collimator, according to the teachings of the present invention.
Figure 2:
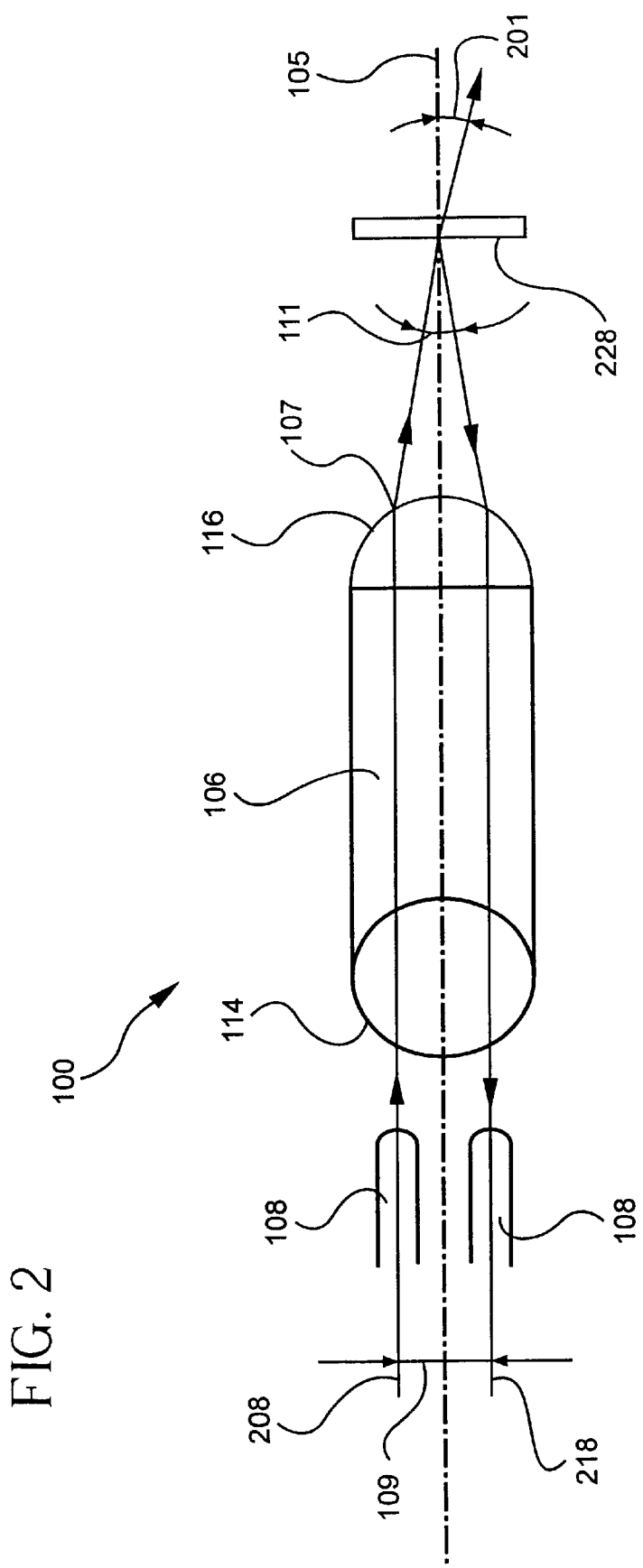
FIG. 2 is a top plan view of the collimator of FIG. 1.

Referring to FIGS. 1 and 2, a side cross-sectional view and a top plan view, respectively, of an optical fiber collimator array 100, according to an embodiment of the present invention, are depicted. Even though multiple number of optical fibers can be arrayed as a multiple input-port, for simplicity, only a pair of optical fibers 108 each has an emitting or receiving cleaved plane 112 to provide a substantially uniform angled or wedged side surface for forming a prescribed angle 101 relative to the object plane 105 of the optical system.

For suppressing back reflections, the prescribed angle 101 is normally set at about 8+/−0.5 degrees. From simple geometry of perpendicularly intersecting lines, each of the cleaved planes of the pair of optical fibers are thus also at about eight degrees from perpendicular to the optical axes of the individual optical fibers.

A method of forming a dual-fiber ferrule for a wedged optic with a single rotationally symmetric surface relative to an optical axis thus includes aligning a pair of optical fibers so that their axes are parallel to each other and lie in a first plane. A suitable supporting material for a dual-fiber ferrule is then used to mate with the aligned fibers and secure them in the dual fiber-ferrule. Finally, the secured fibers are polished at about eight degrees from a second plane which is perpendicular to the first plane.

In the optical or co-ordinate system for orienting a dual-fiber or multi-port ferrule with respect to a collimating lens, the z-axis is parallel to the optical axis 105 and forms the focal plane. The y-axis is vertically or up-and-down the page, and the x-axis is in-and-out of the page and also forms the object plane.

The pair of optical fibers 108 are disposed coplanarly and off-axis in the object plane of the optical system for sharing the optical axis, only in the focal plane, and separated from each other and from the optical axis on the same object plane. In other words, the pair of optical fibers 108 are disposed coplanarly and with their ends describing a line perpendicular to the optical axis. Hence, the fibers 108 are separated off-axis, along the x-axis, lay on the same x-plane or object plane and have the same optical path with respect to the optics that follows, in the z-plane or focal plane. The pair of optical fibers 108 are preferably symmetrically deployed about the optical axis 105 each in an off-axis fiber arrangement with the microlens, on the object plane, for minimizing the distance from the optical axis for either fiber of the pair such that field-dependent wavefront aberrations, for example, coma, are eliminated.

The optics that follows includes a microlens 106. The microlens 106 that would benefit from such a top, x-plane or object plane fiber coplanar orientation has a sloped or wedged rear surface 114 opposite a rotationally symmetric microlens surface 116 which bound a volume having a homogeneous index of refraction. As seen in FIG. 2, the pair of fibers 108 are positioned near the focal plane containing the optical axis of the microlens for the generation or reception of collimated beams at the prescribed angle relative to the optical axis of the microlens.

The angled surface 112, of the fibers 108, and the sloped rear surface 114, of the microlens 106, are designed to suppress reflection at the air-glass boundaries of the fibers 108 and the rear surface of the microlens 106. The microlens 106 is made of a glass (e.g., PYREX®) and can be fixed relatively flush with one end of the fibers 108 at the sloped rear surface 114 which has substantially the same angle as the angled surface 112. Alternatively, the microlens 106 is separated from the fibers 108 by an air gap to accommodate focal error in the lens.

The wedged rear plane surface of the microlens 106 is not necessarily parallel to the cleaved end plane of the fiber 108 which is traditionally set to eight degrees to suppress back-reflections. Generally it is preferred to place a wedge on the microlens 107 so that the center refracted ray from the wedged fiber 108 is refracted into the lens in a direction that is parallel to the initial axis of the fiber i.e. made parallel to the fiber or package axis—by the refraction at the wedged lens surface 114. Hence, if the lens material is different from the fiber material, the sloped rear surface 114 of the microlens 106 is preferably formed at an angle that is different from the angled surface 112 of the fibers 108. Although shown parallel to the prescribed angle 101, the center angle of the sloped rear surface 114 of the microlens 106 is, optionally, adjusted to be a somewhat different value from 8+/−0.5 degrees, depending on the difference between the effective refractive index of the fibers 108 and the microlens 106. If the refractive index of the microlens 106 is 1.66, for example, an appropriate center angle is about 5.5°. In other words, if the wedge angle 101 of the angled fiber face 112 is the standard eight degrees, then the wedge angle of the lens 114 is generally less since the index of the lens material is typically higher than the silica fiber. In this manner and referring to FIG. 1, the microlens 106 is adjusted in relation to the fibers 108 such that the optical beam axis of each of the fibers 108 coincides with the optical axis (i.e., center) of the microlens 106, in the focal plane.

Referring to FIG. 2, the field angle (A) 111 of FIG. 2 is related to the separation (S) 109, on the object plane, between the pair of fibers 108 and the focal length (F) of the microlens by the following equation:

$$S = F \times A \tag{Eq. 1}$$

As seen in FIG. 2, the field angle (A) is subtended by the two fibers 108 placed parallel, uncanted, to each other on the object plane. The field angle is just a working field angle and is variable, depending on the spacing between the fibers. Moreover, the field angle 111 is the angle between incident and reflected rays off the filter 228. Those rays and that angle are determined by the fiber spacing 109. In other words, the field angle (A) is defined by the separation between the fibers divided by the focal length of the rotationally symmetric lens. Hence, the half-angle 201 is half of the field angle 111 as the transmitted ray exits the filter 228.

Generally, in the field of optics, the angle of incidence (AOI) 118 is defined as the angle between the incoming or incident ray 208 to a surface and the inward pointing normal (perpendicular vector to the surface) at the point of incidence. So in the case of the ray entering the wedged surface 114 of the microlens 106, the AOI is not equal to the wedge angle because the incoming ray 208 having exited the cleaved fiber is bent, as seen in FIG. 1, with respect to the lens axis 105. In the other section as seen in FIG. 2, the incident ray 208 is offset by a displacement distance 109 relative to the center optical axis 105, which is at least one-half of the fiber diameter. It is to be noted that although the fibers are shown equi-distant from the optical axis in an off-axis arrangement for simplicity (one-half of the fiber spacing 109) and symmetry, the fibers do not have to be evenly spaced. The incident ray 208 can be made parallel to the fiber axis once again after the refraction of the ray from the wedged lens face and thus strike the rotationally symmetric surface 116 at such a point 107 that the beam is directed in toward the axis at an impinging angle 111. The tangent of this impinging angle 111 is equal to the displacement or one halve the fiber spacing from the center optical axis 105 divided by the focal length of the lens.

By designing an optical filter component to operate with an angle of incidence equal to this impinging angle, it is possible to selectively pass a spectral component of one wavelength while selectively reflecting spectral components of other wavelengths. In other words, the center wavelength is the most sensitive parameter to the incidence angle. The reflected beam returns through the microlens on a path that eventually intersects the receiving fiber at the optimum angle of incidence.

The outgoing ray transmitted through the filter 228 is aligned with other optics, such as a narrow band filter in series with a concatenated second dual fiber wedged rotationally symmetric collimator, similar to the first collimator 100, or with other lenses, fibers, or devices, to form the third port of a three-port optical filtering system or other WDM function.

In general even though the number of input fibers can be uneven, for 3-port filtering applications, an even number of fibers on the input side of the collimator is desired because a fiber 108 on one side of the optical axis 105 for transmitting the incident ray 208 has an output port for a corresponding input port on the other side of the axis for receiving the reflected ray 218. Optical aberrations are minimized when the fiber pairs are symmetrically deployed about the axis to minimize the distance from the axis for either of the pair, and it also eliminates odd wavefront aberrations, such as coma.

Figure 3:
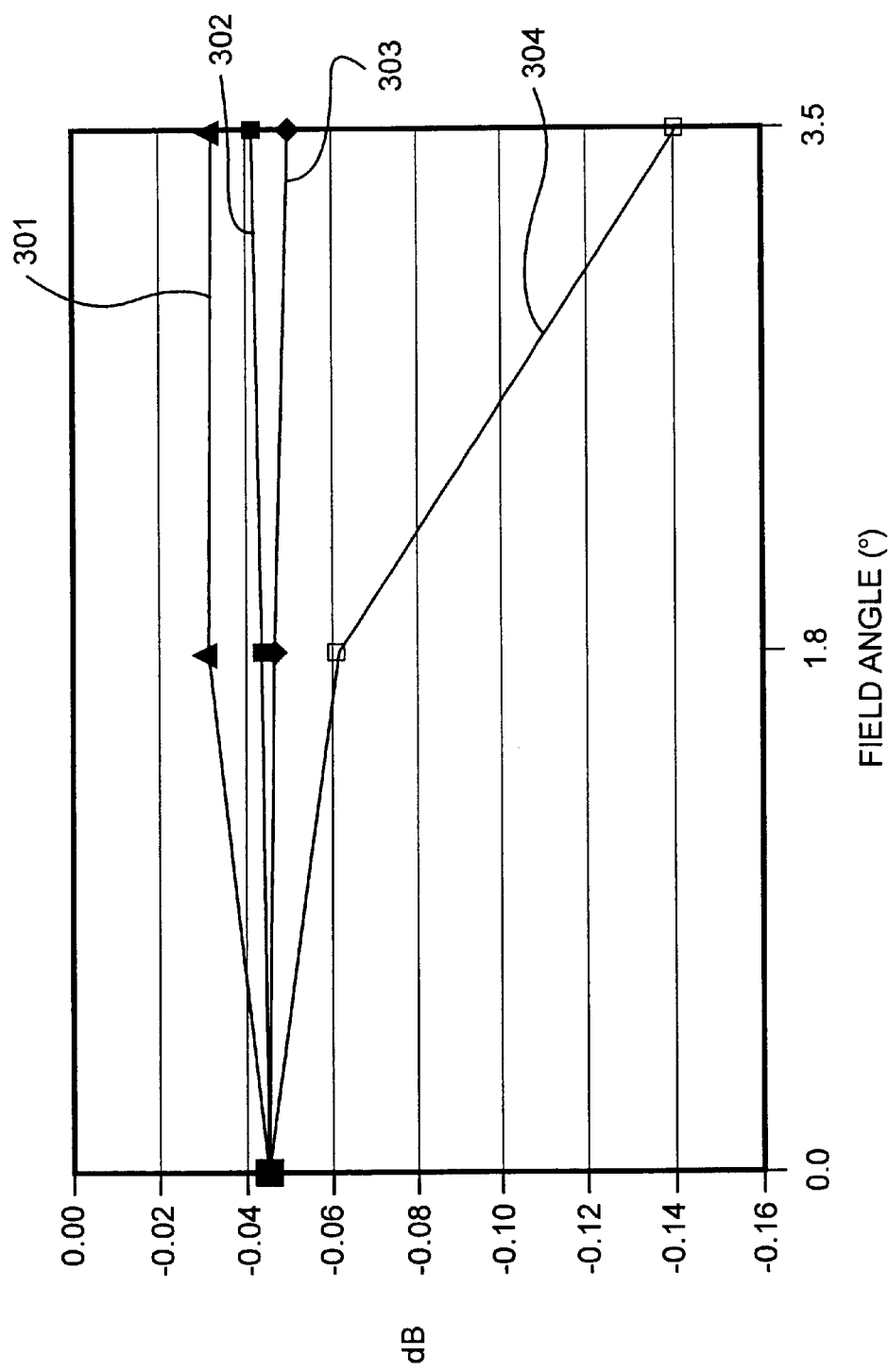
FIG. 3 is a graph of dual-fiber pair loss versus the field angle for various orientations, according to the teachings of the present invention.
Figure 4:
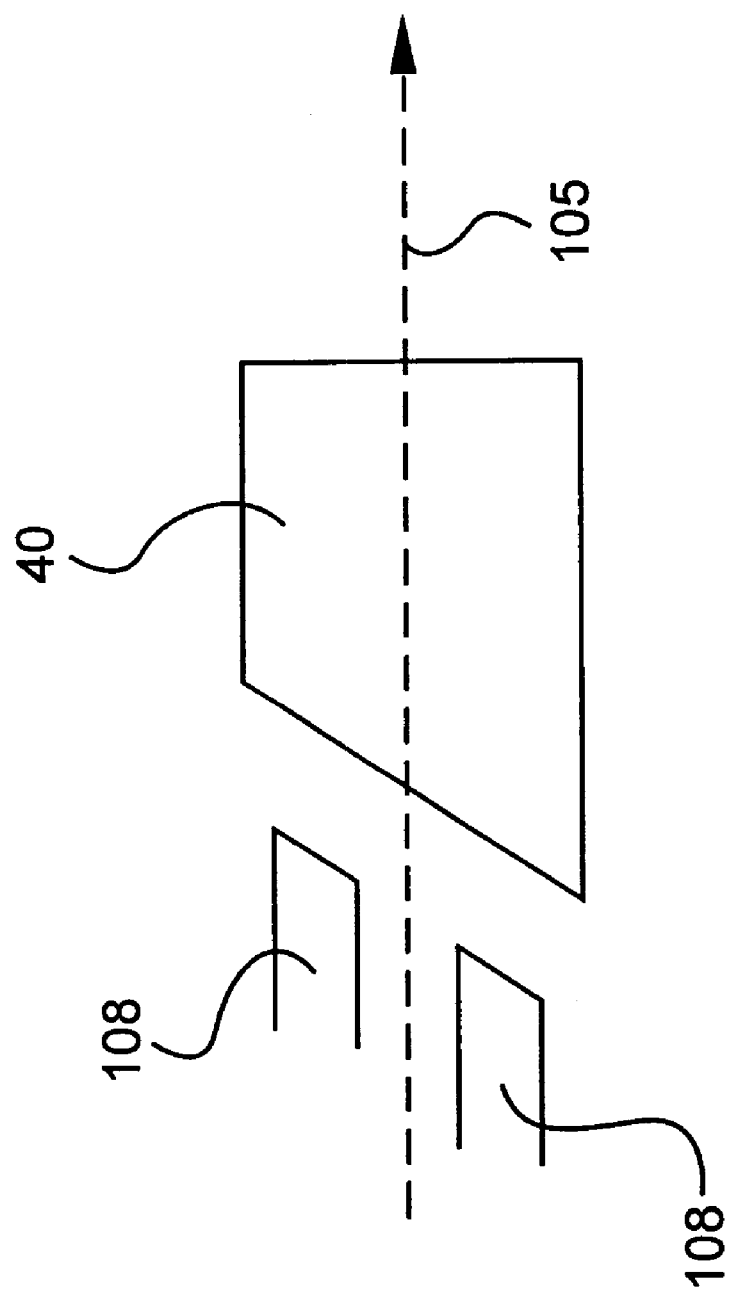
FIG. 4 is a cross-sectional side-view of a vertically stacked and canted dual-fiber collimator.

Referring to FIG. 3, the coupling losses from the pair of uncanted fibers in the top-view of the object plane of FIG. 2, according to the present invention, is seen by curve 301 to be less than the preferred orientation for a GRIN lens 40 with canted fibers on the object plane, as seen in the side-view of FIG. 4 and represented by curve 302.

In FIG. 4, the gradient-index (GRIN) microlens 40 are aligned with two vertically (preferably canted and oriented on the y-axis) stacked fibers 108 as the preferred orientation for a GRIN lens. The curve for the canted solid single surface lens labeled 304, with data points represented by hollow-squares, shows an undesirably high loss for the rotationally symmetric wedged lens 106 of FIG. 2 oriented with the dual-fiber vertically canted arrangement 108 of FIG. 4. The curve 301, with data points represented by triangles, exhibits the best loss performance for the uncanted dual fiber arrangement on the object plane, as oriented in FIG. 2. The orientation of FIG. 2 works better for a wedged single refractive surface of rod lenses than the preferred GRIN orientation of FIG. 4. Contrary to the applicant's top arrangement, the reverse side-arrangement is better for wedged GRIN (gradient index) lenses, as seen in FIG. 4. The astigmatism placed on the wavefronts by these two types of lenses is different and results in different preferential arrangements for the dual fibers.

The preference for either dual fiber orientation for these different types of small lenses or microlenses in terms of optical coupling loss is less when the dual fibers 108 are near the optical axis of the lens. In contrast, the orientation preference for the microlenses is more important when the dual fibers 108 are placed farther apart from each other.

As can be seen in FIG. 3, the pair of optical fibers in the wedged rotationally symmetric optic system on an uncanted object plane provides a minimum total insertion loss of less than 0.3 dB even when the dual fibers are not close to the optical axis, such as when the field angle is between 1.8 and 3.5 degrees. The lower 1.8 degrees is the half-angle subtended by two standard single-mode fibers having a diameter of 125 um placed right next to each other when a standard GRIN is used as the lens. A field angle of 3.5 degrees is just about twice the 1.8 degree angle i.e. one dummy fiber spaced in-between two active fibers 108.

It will become apparent to those skilled in the art that various modifications to the preferred embodiment of the invention as described herein can be made without departing from the spirit or scope of the invention as defined by the appended claims.

The invention claimed is:

1. An optical fiber collimator in an optical system, comprising:
   a pair of optical fibers having cleaved planes to provide a substantially uniform angled side surface for forming a prescribed angle relative to the optical axis of the optical system, the pair of optical fibers disposed coplanarly in the object plane of the optical system for sharing the optical axis and separated from each other and from the optical axis on the same object plane; and
   a microlens having a sloped rear surface opposite a rotationally symmetric microlens surface which bound a volume having a homogeneous index of refraction, the microlens optically coupled to the pair of fibers positioned near the focal plane containing the optical axis of the microlens for the generation or reception of collimated beams at the prescribed angle relative to the optical axis of the microlens, wherein the microlens has a single refractive surface.

2. The collimator of claim 1, wherein the microlens comprises an aspheric lens.

3. The collimator of claim 1, wherein the microlens comprises a spherical lens.

4. The collimator of claim 1, wherein the pair of optical fibers are each equi-distant separated from the optical axis in an off-axis fiber arrangement with the microlens.

5. The collimator of claim 1, wherein the microlens comprises a wedged rod lens having the single refractive surface.

6. The collimator of claim 5, wherein the pair of optical fibers are each equi-distant separated from the optical axis in an off-axis fiber arrangement with the wedged rod lens.

7. The collimator of claim 1, wherein the sloped rear surface of the microlens and each of the emitting cleaved planes of the pair of optical fibers are each at about eight degrees from perpendicular to the optical axes of the individual optical fibers.

8. The collimator of claim 1, wherein the pair of optical fibers is in an aspheric optic system on an uncanted object plane for providing a total insertion loss at less than 0.3 dB when the field angle is between 1.8 and 3.5 degrees.

9. The collimator of claim 1, wherein the pair of optical fibers is in an aspheric optic system on an uncanted object plane for minimizing off-axis aberrations.

10. The collimator of claim 1, further comprising at least a second pair of optical fibers coplanarly disposed with the first pair of optical fibers, wherein each fiber are separated from the optical axis in an off-axis fiber arrangement with the microlens providing more object points that are off-axis.

11. The collimator of claim 1, wherein the pair of optical fibers are symmetrically deployed about the optical axis each in an off-axis fiber arrangement with the microlens for minimizing the distance from the optical axis for either fiber of the pair such that odd wavefront aberrations are eliminated.

12. The collimator of claim 1, wherein the pair of optical fibers are symmetrically deployed about the optical axis each in an off-axis fiber arrangement with the microlens for minimizing the distance from the optical axis for either fiber of the pair such that coma is eliminated.

13. The collimator of claim 1, wherein the microlens comprises a Fresnel lens.

14. The collimator of claim 1, wherein the pair of optical fibers comprises a single-mode source fiber for transmitting incident light and a single-mode receiver fiber for receiving reflected light for a three-port optical filtering system.

15. The collimator of claim 1, wherein the sloped rear surface of the microlens and each of emitting cleaved planes of the pair of optical fibers are each at about eight degrees from perpendicular to the optical axes of the individual optical fibers for reducing back reflection into the pair of fibers.

16. A method of coupling a dual-fiber ferrule for a wedged rotationally symmetric optic system, comprising the steps of:

aligning a pair of optical fibers parallel to each other on a first plane;

securing the aligned fibers in a dual-fiber ferrule; and polishing the secured fibers at about eight degrees from a second plane perpendicular to the first plane.

17. An optical fiber collimator in an optical system, comprising:

an optical fiber array configured to receive and retain at least one pair of individual optical fibers which carry optical signals, the optical fiber array having cleaved planes to provide a substantially uniform angled side surface for forming a prescribed angle relative to the optical axis of the optical system, the optical fiber array disposed coplanarly in the object plane of the optical system for sharing the optical axis and separated from each other and from the optical axis on the same object plane; and a microlens having a sloped rear surface opposite a microlens spherical surface, the at least one pair of fibers positioned near the focal plane containing the optical axis of the microlens for coupling collimated beams at the prescribed angle relative to the optical axis, wherein the microlens comprises a wedged rod lens having a single refractive surface.

18. The collimator of claim 17, wherein the microlens comprises the wedged rod lens for generating or receiving collimated beams.

19. The collimator of claim 18, wherein the at least one pair of individual optical fibers are disposed coplanarly and aligned with the cleaved planes describing a line perpendicular to the optical axis.

* * * * *